(12) United States Patent
Wang et al.

(10) Patent No.: US 10,937,151 B2
(45) Date of Patent: Mar. 2, 2021

(54) AUTOMATIC OPTICAL INSPECTION METHOD

(71) Applicant: SHANGHAI MICRO ELECTRONICS EQUIPMENT (GROUP) CO., LTD., Shanghai (CN)

(72) Inventors: Fan Wang, Shanghai (CN); Hailiang Lu, Shanghai (CN); Kai Zhang, Shanghai (CN)

(73) Assignee: Shanghai Micro Electronics Equipment (Group) Co., Ltd., Shanghai (CN)

(*) Notice: Subject to any disclaimer, the term of this patent is extended or adjusted under 35 U.S.C. 154(b) by 197 days.

(21) Appl. No.: 16/050,261

(22) Filed: Jul. 31, 2018

(65) Prior Publication Data

US 2019/0043182 A1   Feb. 7, 2019

(30) Foreign Application Priority Data

Aug. 2, 2017   (CN) .......................... 201710653164.8

(51) Int. Cl.
*G06K 9/00*     (2006.01)
*G06T 7/00*     (2017.01)
(Continued)

(52) U.S. Cl.
CPC .......... *G06T 7/001* (2013.01); *G01N 21/8851* (2013.01); *G01N 21/9501* (2013.01);
(Continued)

(58) Field of Classification Search
None
See application file for complete search history.

(56) References Cited

U.S. PATENT DOCUMENTS 6,078,386 A * 6/2000 Tsai ................... G01N 21/8806
356/237.1
6,888,959 B2 * 5/2005 Hamamatsu ....... G01N 21/8851
250/396 R
(Continued)

FOREIGN PATENT DOCUMENTS

CN         101349652 A    1/2009
JP         2005127989 A   5/2005
(Continued)

*Primary Examiner* — Soo Jin Park
(74) *Attorney, Agent, or Firm* — Muncy, Geissler, Olds & Lowe, PC (57) ABSTRACT

An automatic optical inspection (AOI) method for inspecting defects on a surface of an object is provided. The method includes: providing at least two different illumination systems; acquiring, by at least one detector, at least two pieces of image information of the object, each piece of image information being acquired under illumination of a corresponding one of the illumination systems; obtaining at least two pieces of surface defect information of the object by analyzing the acquired at least two pieces of image information using a computer and storing at least one of the obtained at least two pieces of surface defect information by the computer; and combining, by the computer, all of the at least two pieces of surface defect information to de-duplicate the at least two pieces of surface defect information and obtain a piece of combined surface defect information.

9 Claims, 5 Drawing Sheets

(51) Int. Cl.
*G01N 21/88* (2006.01)
*G01N 21/95* (2006.01)

(52) U.S. Cl.
CPC .. *G06T 7/0004* (2013.01); *G06T 2207/10016* (2013.01); *G06T 2207/20* (2013.01); *G06T 2207/30148* (2013.01)

(56) References Cited

U.S. PATENT DOCUMENTS

| | | | |
|---|---|---|---|
| 7,274,444 B2* | 9/2007 | Furman | G01N 21/9501 356/237.2 |
| 2005/0168729 A1* | 8/2005 | Jung | G01N 21/956 356/237.2 |
| 2010/0128119 A1* | 5/2010 | Takahashi | G06T 7/001 348/126 |
| 2010/0188486 A1* | 7/2010 | Amanullah | G06T 7/001 348/48 |
| 2015/0369752 A1* | 12/2015 | Honda | G01N 21/9501 356/237.2 |

FOREIGN PATENT DOCUMENTS

| | | |
|---|---|---|
| KR | 20110127165 A | 11/2011 |
| TW | 201100779 A | 1/2011 |
| TW | 201534902 A | 9/2015 |
| WO | WO-2014/043035 A1 | 3/2014 |

* cited by examiner

AUTOMATIC OPTICAL INSPECTION METHOD

CROSS-REFERENCES TO RELATED APPLICATIONS

This application claims the priority of Chinese patent application number 201710653164.8, filed on Aug. 2, 2017, the entire contents of which are incorporated herein by reference.

TECHNICAL FIELD

The present invention relates to the field of defect detection and, in particular, to an automatic optical inspection (AOI) method.

BACKGROUND

Automatic optical inspection (AOI) technology enables fast, high-precision, non-destructive inspection of wafers, chips, or other objects under inspection and is widely used in printed circuit board (PCB), integrated circuit (IC), light-emitting diode (LED), thin-film transistor (TFT), solar panel and other applications.

Because diversified types of defects have varying optical characteristics, an AOI device tends to be equipped with multiple measurement mode options. That is, it often incorporates multiple illumination systems for illuminating an object under inspection so that different defects on the object can be detected in the various measurement modes. This allows high-sensitivity defect inspection with a high detection efficiency. For example, for wafer inspection, defects featuring considerable changes in gray level, such as contaminations and scratches, can be detected under bright-field illumination, while fine particles can be detected in a dark-field illumination mode.

An automatic optical inspection process carried out by an existing AOI device of the aforementioned type typically involves: acquiring image information of the object under inspection using an optical imaging system; identifying surface defects of the object under inspection via computerized comparison of the acquired image information with reference image information; and acquiring, for a second time, the image information of the object under inspection and storing it for subsequent redetermination.

The second acquisition of the image information of the object takes some time, leading to a long detection cycle and low detection efficiency.

SUMMARY OF THE INVENTION

It is an objective of the present invention is to overcome the problem of low detection efficiency as seen in the conventional automatic optical inspection (AOI) devices by proposing an AOI method.

To this end, the proposed AOI method for inspecting defects on the surface of an objective under inspection includes: providing at least two different illumination systems; acquiring, by at least one detector, at least two pieces of image information of the object, each piece of image information being acquired under illumination of a corresponding one of the illumination systems; obtaining at least two pieces of surface defect information of the object by analyzing the acquired at least two pieces of image information using a computer and storing at least one of the obtained at least two pieces of surface defect information by the computer; and combining, by the computer, all of the at least two pieces of surface defect information to de-duplicate the at least two pieces of surface defect information and obtain a piece of combined surface defect information.

Optionally, the acquired at least two pieces of image information may be stored by the computer, the AOI method may further include selecting at least one piece of image information from the at least two pieces of image information stored by the computer; and marking the combined surface defect information in the selected at least one piece of image information and outputting and storing the marked at least one piece of image information.

Optionally, only one piece of image information may be selected from the at least two pieces of image information stored by the computer.

Optionally, at least two pieces of image information may be selected from the at least two pieces of image information stored by the computer, and wherein a part of the combined surface defect information is marked in a part of the selected pieces of image information and a rest part of the combined surface defect information is marked in a rest part of the selected pieces of image information.

Optionally, the at least one detector may acquire the at least two pieces of image information of the object by scanning.

Optionally, during the scanning, the at least one detector may be immobilized and the object is moving.

Optionally, the AOI method may further include, prior to the acquisition of one of the at least two pieces of image information by a corresponding one of the at least one detector, causing a corresponding one of the at least two illumination systems to illuminate the object by a sync controller.

Optionally, the AOI method may further include placing the object on a workpiece stage and sending a first sync signal to a sync controller by the workpiece stage, wherein the sync controller is configured to respectively send a second sync signal and a third sync signal to one of the at least one detector and a corresponding one of the illumination systems, enabling the acquisition of one of the at least two pieces of image information of the object by the one of the at least one detector and the illumination of the object by the corresponding one of the illumination systems.

Optionally, the sync controller first may send the second sync signal to the one of the at least one detector so as to enable the acquisition of the one of the at least two pieces of image information of the object, and during the acquisition, the sync controller then may send the third sync signal to the corresponding one of the illumination systems so as to enable the illumination of the object.

Optionally, two different illumination systems comprised of a bright-field illumination system and a dark-field illumination system may be provided.

Optionally, at least two detectors may be provided with each detector acquiring only one of the at least two pieces of image information of the object under illumination of a corresponding one of the at least two illumination systems.

Optionally, only one detector may be provided, and each of the at least two pieces of image information of the object is acquired by the only one detector under illumination of a corresponding one of the at least two illumination systems.

The proposed AOI method has the following benefits:

Image information of the object under inspection is acquired by the detector under illumination of each of at least one illumination system and analyzed to obtain its surface defect information. The surface defect information is then stored and combined by the computer for de-duplication. This dispenses with the need to again acquire image information of the object using the detector or another image information acquisition device after the combination of the surface defect information, resulting in time savings and improved inspection efficiency.

111—first detector; 112—second detector; 121—bright-field illumination source; 122—dark-field illumination source; 123—bright-field illuminator; 124—dark-field illuminator; 125—first beam splitter; 126—second beam splitter; 130—workpiece stage; 140—sync controller; 150—computer; 160—object under inspection; S11—first step; S12—second step; S13—third step; S14—fourth step; S15—fifth step;

211—first detector; 212—second detector; 213—third detector; 221—bright-field illumination source; 222—dark-field illumination source; 223—IR light source; 224—dark-field illuminator; 225—first beam splitter; 226—second beam splitter; 227—third beam splitter; 228—fourth beam splitter; 230—workpiece stage; 250—computer; 260—object under inspection; S21—first step; S22—second step; S23—third step; S24—fourth step; S25—fifth step; S26—sixth step;

311—first detector; 321—bright-field illumination source; 322—dark-field illumination source; 323—bright-field illuminator; 324—dark-field illuminator; 325—first beam splitter; 330—workpiece stage; 340—sync controller; 350—computer; 360—object under inspection.

DETAILED DESCRIPTION OF EXEMPLARY EMBODIMENTS

Automatic optical inspection (AOI) methods according to this invention will be described below in further detail with reference to the accompanying drawings and a few specific embodiments. Features and advantages of the invention will be more apparent from the following detailed description, and from the appended claims. It is noted that the figures are provided in a very simplified form not necessarily presented to scale, with the only intention to facilitate convenience and clarity in explaining some embodiments of the present invention.

Embodiment 1

Figure 1:
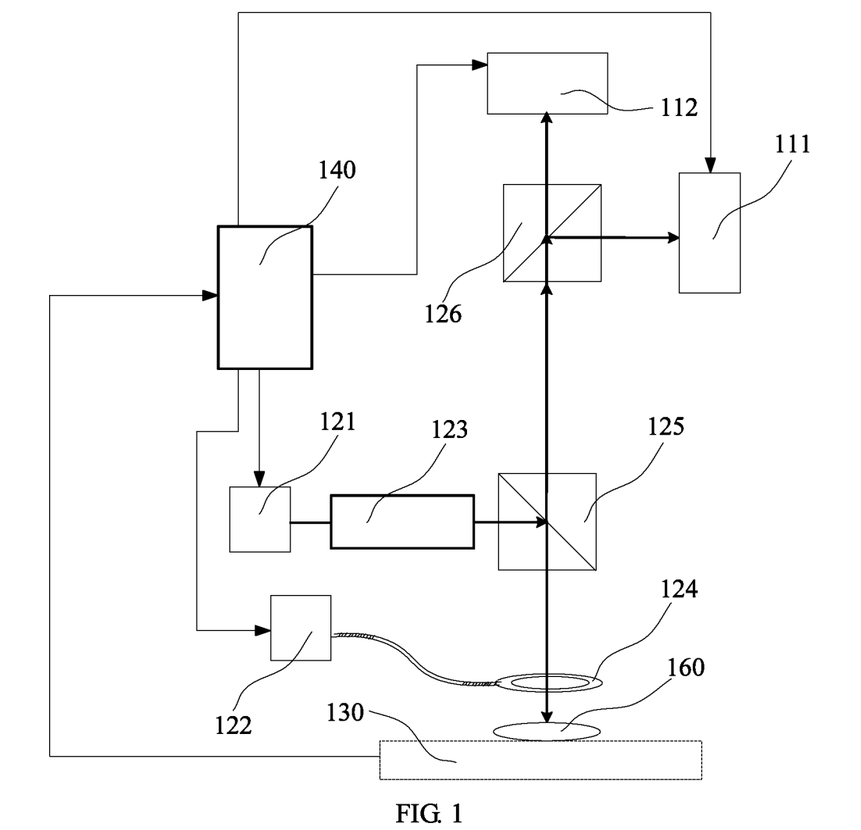
FIG. 1 is a structural schematic of an automatic optical inspection (AOI) device according to a first embodiment of the present invention.
Figure 2:
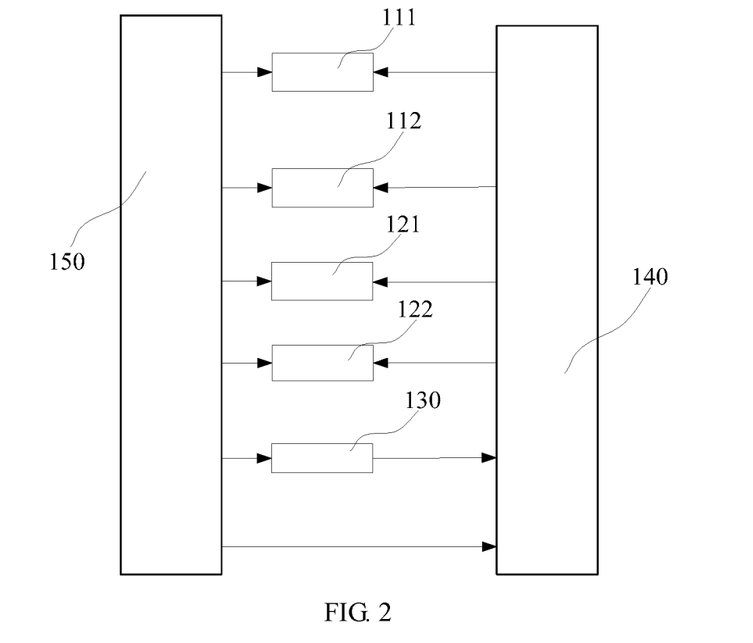
FIG. 2 is an architectural diagram of the AOI device according to the first embodiment of the present invention.
Figure 3:
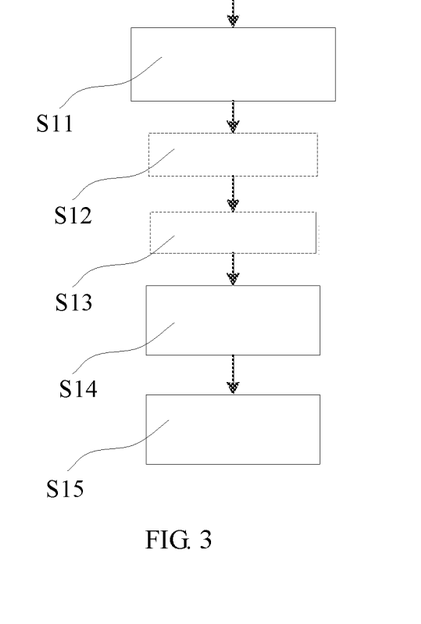
FIG. 3 is a flow chart graphically illustrating an AOI process performed by the AOI device according to the first embodiment of the present invention.

FIG. 1 is a structural schematic of an AOI device according to a first embodiment of the present invention. FIG. 2 is an architectural diagram of the AOI device according to the first embodiment of the present invention. FIG. 3 is a flow chart graphically illustrating an AOI process performed by the AOI device according to the first embodiment of the present invention.

Referring to FIGS. 1 and 2, the AOI device includes a first detector 111, a second detector 112, a bright-field illumination source 121, a dark-field illumination source 122, a bright-field illuminator 123, a dark-field illuminator 124, a first beam splitter 125, a second beam splitter 126, a workpiece stage 130, a sync controller 140 and a computer 150.

The first detector 111 is configured to acquire image information of an object under inspection 160 under illumination by the bright-field illumination source 121 (this image information is hereinafter referred to as the "first image information"). Light from the bright-field illumination source 121 is processed by the bright-field illuminator 123 and then passes through the first beam splitter 125. Subsequently, it is irradiated onto the object 160 and reflected thereby back to the first beam splitter 125. After exiting the first beam splitter 125, the light enters into the second beam splitter 126 and then reflected by the second beam splitter 126 into the first detector 111 where it is processed to obtain the first image information. The bright-field illuminator 123 is adapted to adjust one or more of the propagation direction, intensity, wavelength range, polarization and other parameters of the light. The bright-field illumination source 121 and the bright-field illuminator 123 together constitute a bright-field illumination system.

The second detector 112 is configured to acquire image information of the object 160 under illumination by the dark-field illumination source 122 (this image information is hereinafter referred to as the "second image information"). Processed by the dark-field illuminator 124, light from the dark-field illumination source 122 is irradiated onto the object 160 and reflected thereby toward the first beam splitter 125. After exiting the first beam splitter 125, the light further passes through the second beam splitter 126 and then reaches the second detector 112 where it is processed to obtain the second image information. The dark-field illuminator 124 is adapted to adjust one or more of the propagation direction, intensity, wavelength range, polarization and other parameters of the light. The dark-field illumination source 122 and the dark-field illuminator 124 together constitute a dark-field illumination system.

The workpiece stage 130 is configured to support the object 160 and is movable relative to the first detector 111 and the second detector 112. In this embodiment, in order for high inspection efficiency to be achieved, the first detector 111 and the second detector 112 obtain the image information of the object by means of scanning. In this embodiment, during the obtainment of the image information, the first detector 111 and the second detector 112 are immobilized while the workpiece stage 130 is moving. Of course, in other embodiments, the information may be obtained alternatively with the first detector 111 and the second detector 112 being in movement and with the workpiece stage 130 being immobilized. In still another embodiment, the first detector 111, the second detector 112 and the workpiece stage 130 may all be moving during the obtainment of the image information.

Referring to FIGS. 1 and 2, the sync controller 140 has an input connected to the workpiece stage 130 and an output connected to each of the bright-field illumination source 121, the dark-field illumination source 122, the first detector 111 and the second detector 112. The sync controller 140 is configured to control an operating sequence of the bright-field illumination source 121, the dark-field illumination source 122, the first detector 111 and the second detector 112 based on positional information of the workpiece stage 130.

Referring to FIG. 2, the computer 150 is connected to each of the first detector 111, the second detector 112, the bright-field illumination source 121, the dark-field illumination source 122, the workpiece stage 130 and the sync controller 140. The computer 150 is adapted to configure parameters of the sync controller 140, the first detector 111 and the second detector 112, brightness of the sources 121, 122 and the like. The computer 150 is further configured to control the movement of the workpiece stage 130.

The bright-field illumination source 121 and the dark-field illumination source 122 may be scintillation light sources, for example, LED scintillators, xenon scintillators, etc.

The object 160 may be a wafer, an LED substrate, a TFT panel, a PCB or the like. In this embodiment, the object 160 is a wafer.

During the inspection, a number of inspection points may be defined on the wafer, each corresponding to a measurement position of the wafer to be measured. These inspection points may be inspected using the following AOI method one by one in a certain order. Of course, image information of the whole wafer may be alternatively acquired in a single cycle. In this embodiment, the approach of acquiring the image information of the whole wafer in a single cycle is employed. An AOI process performed by the above device will be detailed below with reference to FIG. 3.

In step S11, a wafer is loaded on the workpiece stage 130 and aligned to be ready for subsequent acquisition of its image information by the first detector 111 and the second detector 112.

In step S12, the first detector 111 acquires first image information of the wafer under illumination by the bright-field illumination source 121. Specifically, when the workpiece stage 130 arrives with the wafer carried thereon at one of several measurement positions, the workpiece stage 130 sends a first sync signal to the sync controller 140 which then, based on its own delay conditions, sends a second sync signal to the first detector 111 to allow an integral measurement performed by the first detector 111. During this integral measurement, the sync controller 140 sends a third sync signal to the bright-field illumination source 121 to indicate it to produce a light pulse for illumination, i.e., bright-field illumination. Under the bright-field illumination, the first detector 111 acquires the first image information of the object 160 and transmits it to the computer 150, and then the first image information is stored by the computer 150, for example, on a local memory or hard disk drive (HDD) or on an external storage device. In addition, the computer 150 analyzes the acquired first image information to obtain first surface defect information of the wafer which is then stored by the computer 150. This process is repeated for all of the remaining measurement positions so that the whole wafer is scanned by the first detector 111. In other words, the first detector 111 completes the first image information acquisition for the whole wafer under illumination of the bright-field illumination source 121. In this embodiment, during the analysis performed by the computer 150 on the acquired first image information, the first surface defect information may be determined by identifying a minority of the first image information that differs from the remaining majority of the first image information. Alternatively, the first surface defect information may also be identified by a comparison with reference image information. Still alternatively, these two approaches may be combined to find the first surface defect information. The reference image information may at least not containing image information of defect(s) of interest according to this embodiment. For example, if the inspection is performed on the object, i.e., the wafer, to find whether pits or point defects are present on the surface of the wafer, the reference image information will not contain image information of such pits or point defects and optionally other defects.

In step S13, the second detector 112 acquires second image information of the wafer under illumination by the dark-field illumination source 122.

Specifically, when the workpiece stage 130 arrives with the wafer carried thereon at one of the measurement positions, the workpiece stage 130 sends a fourth sync signal to the sync controller 140 which then, based on its own delay conditions, sends a fifth sync signal to the second detector 112 to allow an integral measurement performed by the second detector 112. During this integral measurement, the sync controller 140 sends a sixth sync signal to the dark-field illumination source 122 to indicate it to produce a light pulse for illumination, i.e., dark-field illumination. Under the dark-field illumination, the second detector 112 acquires the second image information of the object 160 and transmits it to the computer 150, and then the second image information is also stored by the computer 150, for example, on a local memory or HDD or on an external storage device. In addition, the computer 150 analyzes the acquired second image information to obtain second surface defect information of the wafer which is then stored by the computer 150. This process is repeated for all of the remaining measurement positions so that the whole wafer is scanned by the second detector 112. In other words, the second detector 112 completes the second image information acquisition for the whole wafer under illumination of the dark-field illumination source 122.

In step S14, during and/or after the acquisition of the image information by the second detector 112 under illumination by the dark-field illumination source 122, the computer 150 combines the first surface defect information and the second surface defect information to de-duplicate the defect information.

In step S15, the combined surface defect information is marked in the second image information by the computer 150 and the marked second image information is output and stored. With this done, the scanning inspection of the wafer is completed.

In the above AOI process according to this embodiment performed by the AOI device, alternatively, the second detector 112 may acquire the second image information of the wafer under illumination of the dark-field illumination source 122 prior to the acquisition of the first image information of the wafer by the first detector 111 under illumination of the bright-field illumination source 121. In this case, during and/or after the acquisition of the image information by the first detector 111 under illumination by the bright-field illumination source 121, the computer 150 combines the first surface defect information and the second surface defect information to de-duplicate the defect information. That is, steps S12 and S13 can be performed in a reverse order. In the above AOI process according to this embodiment performed by the AOI device, still alternatively, the second detector 112 may acquire image information of the wafer under illumination of the bright-field illumination source 121, followed by the acquisition of image information of the wafer by the first detector 111 under dark-field illumination of the source 122.

In this embodiment, the combined surface defect information may alternatively not be marked in the second image information. Instead, the second image information may be output and stored directly following the combination of the surface defect information by the computer 150.

Embodiment 2

An AOI process according to this embodiment differs from that of the first embodiment in that, directly after the first image information acquired by the first detector under bright-field illumination is transmitted to the computer, the computer analyzes the first image information and obtains the first surface defect information. Additionally, the first surface defect information is then stored by the computer while the first image information is not stored by the computer.

Specifically, the AOI process according to this embodiment includes the following steps.

In step S11', a wafer is loaded on the workpiece stage and aligned to be ready for subsequent acquisition of its image information by the first detector and the second detector.

In step S12', the first detector acquires first image information of the wafer under illumination by the bright-field illumination source. Specifically, when the workpiece stage arrives with the wafer carried thereon at one of the measurement positions, the workpiece stage sends a first sync signal to the sync controller which then, based on its own delay conditions, sends a second sync signal to the first detector to allow an integral measurement performed by the first detector. During this integral measurement, the sync controller sends a third sync signal to the bright-field illumination source to indicate it to produce a light pulse for illumination, i.e., bright-field illumination. Under the bright-field illumination, the first detector acquires the first image information of the object and transmits it to the computer which then analyzes the acquired first image information to obtain first surface defect information of the wafer and stores the first surface defect information. This process is repeated for all of the remaining measurement positions so that the whole wafer is scanned by the first detector. In other words, the first detector completes the first image information acquisition for the whole wafer and achieves obtainment of the first surface defect information.

In step S13', the second detector acquires second image information of the wafer under illumination by the dark-field illumination source.

Specifically, when the workpiece stage arrives with the wafer carried thereon at one of the measurement positions, the workpiece stage sends a fourth sync signal to the sync controller which then, based on its own delay conditions, sends a fifth sync signal to the second detector to allow an integral measurement performed by the second detector. During this integral measurement, the sync controller sends a sixth sync signal to the dark-field illumination source to indicate it to produce a light pulse for illumination, i.e., dark-field illumination. Under the dark-field illumination, the second detector acquires the second image information of the object and transmits it to the computer which then stores the second image information, for example, on a local memory or HDD or on an external storage device. In addition, the computer analyzes the acquired second image information to obtain second surface defect information of the wafer which is then stored by the computer. This process is repeated for all of the remaining measurement positions so that the whole wafer is scanned by the second detector. In other words, the second detector completes the second image information acquisition for the whole wafer under illumination by the dark-field illumination source.

In step S14', during and/or after the acquisition of the image information by the second detector under illumination by the dark-field illumination source, the computer combines the first surface defect information and the second surface defect information to de-duplicate the defect information.

In step S15', the combined surface defect information is marked in the second image information by the computer and the marked second image information is output and stored. With this done, the scanning inspection of the wafer is completed.

Embodiment 3

An AOI process performed according to this embodiment differs from that of the first embodiment in that, the second image information of the object is obtained from processing by the computer of image information of the wafer acquired by the second detector under illustration of the bright-field illumination source and is analyzed to obtain the second surface defect information of the wafer. Additionally, the surface defect information is then stored by the computer while the second image information is not.

Specifically, the AOI process according to this embodiment includes the following steps.

In step S11", a wafer is loaded on the workpiece stage and aligned to be ready for subsequent acquisition of its image information by the first detector and the second detector.

In step S12", the first detector acquires first image information of the wafer under illumination by the bright-field illumination source. Specifically, when the workpiece stage arrives with the wafer carried thereon at one of the measurement positions, the workpiece stage sends a first sync signal to the sync controller which then, based on its own delay conditions, sends a second sync signal to the first detector to allow an integral measurement performed by the first detector. During this integral measurement, the sync controller sends a third sync signal to the bright-field illumination source to indicate it to produce a light pulse for illumination, i.e., bright-field illumination. Under the bright-field illumination, the first detector acquires the first image information of the object and transmits it to the computer which then stores the first image information, for example, on a local memory or HDD or on an external storage device. In addition, the computer analyzes the acquired first image information to obtain first surface defect information of the wafer which is then stored by the computer. This process is repeated for all of the remaining measurement positions so that the whole wafer is scanned by the first detector. In other words, the first detector completes the first image information acquisition for the whole wafer under illumination of the bright-field illumination source.

In step S13", the second detector acquires second image information of the wafer under illumination by the dark-field illumination source.

Specifically, when the workpiece stage arrives with the wafer carried thereon at one of the measurement positions, the workpiece stage sends a fourth sync signal to the sync controller which then, based on its own delay conditions, sends a fifth sync signal to the second detector to allow an integral measurement performed by the second detector. During this integral measurement, the sync controller sends a sixth sync signal to the dark-field illumination source to indicate it to produce a light pulse for illumination, i.e., dark-field illumination. Under the dark-field illumination, the second detector acquires the second image information of the object and transmits it to the computer which then analyzes the acquired second image information to obtain second surface defect information of the wafer and stores the second surface defect information. This process is repeated for all of the remaining measurement positions so that the whole wafer is scanned by the second detector. In other words, the second detector completes the second image information acquisition for the whole wafer and achieves obtainment of the second surface defect information.

In step S14", during and/or after the acquisition of the image information by the second detector under illumination by the dark-field illumination source, the computer combines the first surface defect information and the second surface defect information to de-duplicate the defect information.

In step S15", the combined surface defect information is marked in the second image information by the computer and the marked second image information is output and stored. With this done, the scanning inspection of the wafer is completed.

Embodiment 4

An AOI process in accordance with this embodiment differs from that of the first embodiment in that additional image information is acquired under illustration of an infrared (IR) light source.

Figure 4:
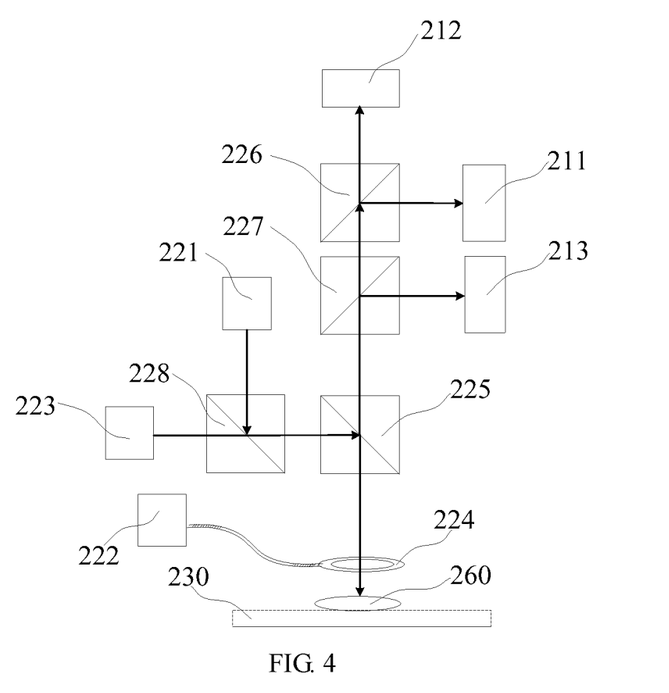
FIG. 4 is a structural schematic of an AOI device according to a fourth embodiment of the present invention.
Figure 5:
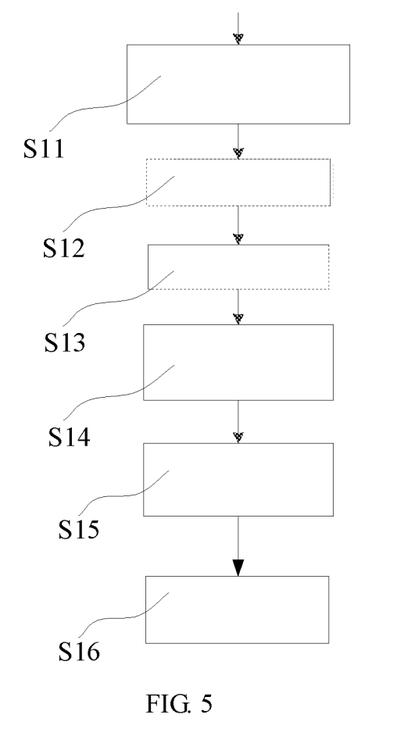
FIG. 5 is a flow chart graphically illustrating an AOI process performed by the AOI device according to the fourth embodiment of the present invention.

FIG. 4 is a structural schematic of an AOI device according to the fourth embodiment of the present invention. FIG. 5 is a flow chart graphically illustrating the AOI process performed by the AOI device according to the fourth embodiment of the present invention.

Referring to FIGS. 4 and 5, the AOI device includes a first detector 211, a second detector 212, a third detector 213, a bright-field illumination source 221, a dark-field illumination source 222, an IR light source 223, a dark-field illuminator 224, a first beam splitter 225, a second beam splitter 226, a third beam splitter 227, a fourth beam splitter 228, a workpiece stage 230 and a computer 250.

The first detector 211 is configured to acquire image information of an object under inspection 260 under illumination by the bright-field illumination source 221 (this image information is hereinafter referred to as the "first image information"). After passing sequentially through the fourth beam splitter 228 and the first beam splitter 225, light from the bright-field illumination source 221 is incident on the object 260 and reflected thereby again back to the first beam splitter 225. After exiting the first beam splitter 225, the light enters into the third beam splitter 227 and the second beam splitter 226 and then reflected by the second beam splitter 226 into the first detector 111 where it is processed to obtain the first image information. The bright-field illumination source 211, the fourth beam splitter 228 and the first beam splitter 225 together constitute a bright-field illumination system. The second detector 212 is configured to acquire image information of the object 260 under illumination by the dark-field illumination source 222 (this image information is hereinafter referred to as the "second image information"). Processed by the dark-field illuminator 224, light from the dark-field illumination source 222 is irradiated onto the object 260 and reflected thereby toward the first beam splitter 225. After exiting the first beam splitter 225, the light further passes through the third beam splitter 227 and the second beam splitter 226 and then reaches the second detector 212 where it is processed to obtain the second image information. The dark-field illuminator 224 is adapted to adjust one or more of the propagation direction, intensity, wavelength range, polarization and other parameters of the light. The dark-field illumination source 222, the dark-field illumination source 222 and the dark-field illuminator 224 together constitute a dark-field illumination system.

The third detector 213 is configured to acquire image information of the object 260 under illumination by the IR light source 223 (this image information is hereinafter referred to as the "third image information"). After passing through the fourth beam splitter 228, light from the IR light source 223 is incident on the object 260 and reflected thereby toward the first beam splitter 225. After exiting the first beam splitter 225, the light further passes through the third beam splitter 227 and the second beam splitter 226 and then reaches the second detector 212 where it is processed to obtain the third image information. The IR light source 223 and the fourth beam splitter 228 together constitute an IR illumination system.

The workpiece stage 230 is configured to support the object 260. In this embodiment, in order for high inspection efficiency to be achieved, the first detector 211, the second detector 212 and the third detector 213 acquire the image information of the object by means of scanning. In this embodiment, during the acquisition of the image information by the first detector 211, the second detector 212 and the third detector 213, the first detector 211 and the second detector 212 are immobilized while the workpiece stage 230 is moving.

The computer 250 is connected to each of the first detector 211, the second detector 212, the third detector 213, the bright-field illumination source 221, the dark-field illumination source 222, the IR light source 223 and the workpiece stage 230. The computer 250 is adapted to configure one or more of parameters of the first detector 211, the second detector 212 and the third detector 213, brightness of the light sources and the like. The computer 250 is further configured to control the movement of the workpiece stage 230.

The IR light source 223 may be an IR LED or the like. Preferably, the IR light source 223 has a wavelength of 780 nm. In this case, the third detector 213 is an IR detector. The third beam splitter 227 and the fourth beam splitter 228 are each configured to combine or separate infrared light with or from visible light.

In this embodiment, the object 260 is a wafer, and the AOI device acquires image information of the whole wafer in a single cycle.

The AOI process performed by the above device according to this embodiment will be detailed below with reference to FIG. 5.

In step S21, a wafer is loaded on the workpiece stage 230 and aligned to be ready for subsequent acquisition of its image information by the first detector 211, the second detector 212 and the third detector 213.

In step S22, the first detector 211 acquires first image information of the wafer under illumination by the bright-field illumination source 221. This step is similar to that as described above in the first embodiment, and a detailed description of it is not repeated here.

In step S23, the second detector 212 acquires second image information of the wafer under illumination by the dark-field illumination source 222. Likewise, this step is similar to that as described above in the first embodiment, and a detailed description of it is not repeated here.

In step S24, the third detector 213 acquires third image information of the wafer under illumination by the IR light source 223. Specifically, when the workpiece stage 230 arrives with the wafer carried thereon at one of several measurement positions, the third detector 213 performs an integral measurement. During this integral measurement, the IR light source 223 produces a light pulse for illumination, i.e., IR illumination. Under the IR illumination, the third detector 213 acquires the third image information of the object 260 transmits it to the computer 250 which then stores the third image information, for example, on a local memory or HDD or on an external storage device. In addition, the computer 250 analyzes the acquired third image information to obtain third surface defect information of the wafer which is then stored by the computer 250. This process is repeated for all of the remaining measurement positions so that the whole wafer is scanned by the third detector 213. In other words, the third detector 213 completes the third image information acquisition for the whole wafer under illumination of the IR light source 223.

In step S25, during and/or after the acquisition of the image information by the third detector 213 under illumination by the IR light source 223, the computer 250 combines the first surface defect information, the second surface defect information and the third surface defect information to de-duplicate the defect information.

In step S26, the combined surface defect information is marked in the third image information by the computer 250 and the marked third image information is output and stored. With this done, the scanning inspection of the wafer is completed.

In other embodiments, the order in which the steps for acquires the first image information, the second image information and the third image information may be changed according to practical needs. Accordingly, the computer 250 may combine all the surface defect information in or after the last one of these steps, or after all of the image information has been acquired in the last step.

In other embodiments, the AOI device may also include additional illumination system(s), associated detector(s) and component(s) necessary for light emanated from the illumination system(s) to be incident on the object and for the AOI device to acquire image information of the object under illustration of the additional illumination system(s).

In other embodiments, the image information of the object acquired under illustration of selected one(s) of the illumination systems may be stored by the computer so that the defect information may be marked in the image information before it is subsequently output and again stored. For example, only the image information acquired under illustration of the dark-field illumination system may be store while that acquired under illustration of the remaining illumination systems is not. Alternatively, the image information acquired under illustration of more than one of the illumination systems may be stored, with part of the surface defect information being marked in part of the stored image information and the rest of the surface defect information being marked in the rest of the image information. In this case, multiple types of image information marked with surface defect information of different types will be output.

Embodiment 5

An AOI process according to this embodiment differs from that of the first embodiment in that only one detector acquires both image information of the object under illustration of the bright-field illumination system and image information thereof under illustration of the dark-field illumination system.

Figure 6:
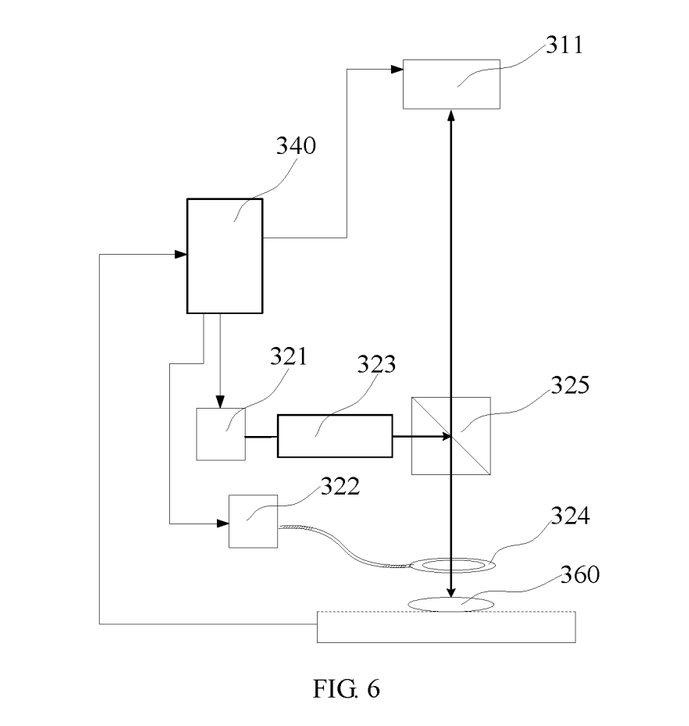
FIG. 6 is a structural schematic of an AOI device according to a fifth embodiment of the present invention.
Figure 7:
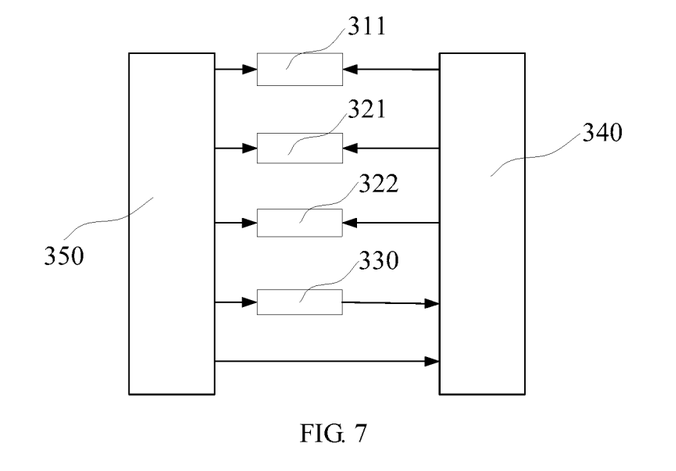
FIG. 7 is an architectural diagram of the AOI device according to the fifth embodiment of the present invention.

FIG. 6 is a structural schematic of an AOI device according to this embodiment and FIG. 7 is an architectural diagram of the AOI device.

Referring to FIGS. 6 and 7, the AOI device includes a first detector 311, a bright-field illumination source 321, a dark-field illumination source 322, a bright-field illuminator 323, a dark-field illuminator 324, a first beam splitter 325, a workpiece stage 330, a sync controller 340 and a computer 350.

The first detector 311 is configured to acquire image information of an object under inspection 160 under illustration of the bright-field illumination system 321 (this image information is hereinafter referred to as the "first image information") and image information thereof under illustration of the dark-field illumination system 322 (this image information is hereinafter referred to as the "second image information"). Light from the bright-field illumination source 321 is processed by the bright-field illuminator 323 and then enters into the first beam splitter 325. Subsequently, it is irradiated onto the object 160 and reflected thereby back to the first beam splitter 325. After exiting the first beam splitter 325, the light is received by the first detector 311 where it is processed to obtain the first image information. Light from the dark-field illumination source 322 is processed by the dark-field illuminator 324 and reflected by the object 160 toward the first beam splitter 325. After exiting the first beam splitter 325, the light is received by the first detector 311 where it is processed to obtain the second image information. Both of the bright-field illuminator 323 and the dark-field illuminator 324 are configured to adjust one or more of the propagation direction, intensity, wavelength range, polarization and other parameters of the light. The bright-field illumination source 321 and the bright-field illuminator 123 together constitute a bright-field illumination system. The dark-field illumination source 322 and the dark-field illuminator 324 together constitute a dark-field illumination system. The workpiece stage 330 is configured to support the object 160 and is movable relative to the first detector 311. In this embodiment, in order for high inspection efficiency to be achieved, the first detector 311 obtains the image information of the object by means of scanning. In this embodiment, during the obtainment of the image information, the first detector 311 is immobilized while the workpiece stage 330 is moving. Of course, in other embodiments, the information may be obtained alternatively with the first detector 311 being in movement and with the workpiece stage 330 being immobilized. In still another embodiment, the first detector 311 and the workpiece stage 130 may both be moving during the obtainment of the image information.

Referring to FIGS. 6 and 7, the sync controller 340 has an input connected to the workpiece stage 330 and an output connected to each of the bright-field illumination source 321, the dark-field illumination source 322 and the first detector 311. The sync controller 340 is configured to control an operating sequence of the bright-field illumination source 321, the dark-field illumination source 322 and the first detector 311 based on positional information of the workpiece stage 330.

Referring to FIG. 7, the computer 350 is connected to each of the first detector 311, the bright-field illumination source 321, the dark-field illumination source 322, the workpiece stage 330 and the sync controller 340. The computer 350 is adapted to configure parameters of the sync controller 340 and the first detector 111, brightness of the sources 321, 322 and the like. The computer 350 is further configured to control the movement of the workpiece stage 330.

The bright-field illumination source 321 and the dark-field illumination source 322 may be scintillation light sources. In this embodiment, the object 160 is a wafer and the AOI device acquires image information of the whole wafer in a single cycle.

The AOI process according to this embodiment includes the following steps.

In a first step, a wafer is loaded on the workpiece stage 330 and aligned to be ready for subsequent acquisition of its image information by the first detector 311.

In a second step, the first detector 311 acquires first image information of the wafer under illumination by the bright-field illumination source 321. Specifically, when the workpiece stage 330 arrives with the wafer carried thereon at one of the measurement positions, the workpiece stage sends a first sync signal to the sync controller 340 which then, based on its own delay conditions, sends a second sync signal to the first detector 311 to allow an integral measurement performed by the first detector. During this integral measurement, the sync controller 340 sends a third sync signal to the bright-field illumination source 321 to indicate it to produce a light pulse for illumination, i.e., bright-field illumination. Under the bright-field illumination, the first detector 311 acquires the first image information of the object 160 and transmits it to the computer 350 which then stores the first image information, for example, on a local memory or HDD or on an external storage device. In addition, the computer 350 analyzes the acquired first image information to obtain first surface defect information of the wafer which is then stored by the computer 350. This process is repeated for all of the remaining measurement positions so that the whole wafer is scanned by the first detector 311. In other words, the first detector 311 completes the first image information acquisition for the whole wafer under illumination of the bright-field illumination source 321.

In a third step, the first detector 311 acquires second image information of the wafer under illumination by the dark-field illumination source 322.

Specifically, when the workpiece stage 330 arrives with the wafer carried thereon at one of the measurement positions, the workpiece stage sends a fourth sync signal to the sync controller 340 which then, based on its own delay conditions, sends a fifth sync signal to the first detector 311 to allow an integral measurement performed by the first detector 311. During this integral measurement, the sync controller 340 sends a sixth sync signal to the dark-field illumination source 322 to indicate it to produce a light pulse for illumination, i.e., dark-field illumination. Under the dark-field illumination, the first detector 311 acquires the second image information of the object 160 and transmits it to the computer 350 which then stores the second image information, for example, on a local memory or HDD or on an external storage device. In addition, the computer 350 analyzes the acquired second image information to obtain second surface defect information of the wafer which is then stored by the computer 350. This process is repeated for all of the remaining measurement positions so that the whole wafer is scanned by the first detector 311. In other words, the first detector 311 completes the second image information acquisition for the whole wafer under illumination of the dark-field illumination source 322.

In a fourth step, during and/or after the acquisition of the image information by the first detector 311 under illumination by the dark-field illumination source 322, the computer 350 combines the first surface defect information and the second surface defect information to de-duplicate the defect information.

In a fifth step, the combined surface defect information is marked in the second image information by the computer 350 and the marked second image information is output and stored. With this done, the scanning inspection of the wafer is completed.

In the AOI process according to this embodiment, in order for the AOI device to have a simple structure, the first detector may also be used to acquire image information under illustration of additional illumination system(s).

The description presented above is merely that of a few preferred embodiments of the present invention and does not limit the scope thereof in any sense. Any and all changes and modifications made by those of ordinary skill in the art based on the above teachings fall within the scope as defined in the appended claims.

What is claimed is:

1. An automatic optical inspection (AOI) method for inspecting defects on a surface of an object under inspection, the method comprising:
   providing at least two different illumination systems;
   acquiring, by at least one detector, at least two pieces of image information of the object, each piece of image information being acquired under illumination of a corresponding one of the illumination systems;
   obtaining at least two pieces of surface defect information of the object by analyzing the acquired at least two pieces of image information using a computer and storing at least one of the obtained at least two pieces of surface defect information by the computer; and
   combining, by the computer, all of the at least two pieces of surface defect information to de-duplicate the at least two pieces of surface defect information and obtain a piece of combined surface defect information,
   wherein the AOI method further comprises placing the object on a workpiece stage, and wherein acquiring each piece of image information of the object comprises:
   sending a first sync signal to a sync controller by the workpiece stage;
   sending a second sync signal to one of the at least one detector by the sync controller so as to enable the acquisition of the piece of image information of the object and allow an integral measurement performed by the at least one detector; and
   sending, during the integral measurement, a third sync signal to a corresponding one of the illumination systems by the sync controller so as to enable the illumination of the object by the corresponding one of the illumination systems.

2. The AOI method as claimed in claim 1, wherein the acquired at least two pieces of image information is stored by the computer, and the AOI method further comprises:
   selecting at least one piece of image information from the at least two pieces of image information stored by the computer; and
   marking the combined surface defect information in the selected at least one piece of image information and outputting and storing the marked at least one piece of image information.

3. The AOI method as claimed in claim 2, wherein only one piece of image information is selected from the at least two pieces of image information stored by the computer.

4. The AOI method as claimed in claim 2, wherein at least two pieces of image information is selected from the at least two pieces of image information stored by the computer, and wherein a part of the combined surface defect information is marked in a part of the selected pieces of image information and a rest part of the combined surface defect information is marked in a rest part of the selected pieces of image information.

5. The AOI method as claimed in claim 1, wherein the at least one detector acquires the at least two pieces of image information of the object by scanning.

6. The AOI method as claimed in claim 5, wherein during the scanning, the at least one detector is immobilized and the object is moving.

7. The AOI method as claimed in claim 1, wherein two different illumination systems comprised of a bright-field illumination system and a dark-field illumination system are provided.

8. The AOI method as claimed in claim 1, wherein at least two detectors are provided with each detector acquiring only one of the at least two pieces of image information of the object under illumination of a corresponding one of the at least two illumination systems.

9. The AOI method as claimed in claim 1, wherein only one detector is provided, and each of the at least two pieces of image information of the object is acquired by the only one detector under illumination of a corresponding one of the at least two illumination systems.

\* \* \* \* \*